United States Patent [19]

Poumakis

[11] Patent Number: 4,560,938
[45] Date of Patent: Dec. 24, 1985

[54] FAIL-PASSIVE DRIVER CIRCUIT

[75] Inventor: Demetrius Poumakis, W. Palm Beach, Fla.

[73] Assignee: United Technologies Corporation, Hartford, Conn.

[21] Appl. No.: 584,215

[22] Filed: Feb. 27, 1984

[51] Int. Cl.$^4$ .................................. G05B 11/28
[52] U.S. Cl. ..................................... 328/71
[58] Field of Search .................. 328/71; 318/341, 257, 318/280, 286, 282, 289, 293, 599

[56] References Cited

U.S. PATENT DOCUMENTS

| | | | |
|---|---|---|---|
| 3,783,360 | 1/1974 | Bundy | 318/341 |
| 3,989,992 | 11/1976 | Schmidt | 318/341 |
| 4,383,245 | 5/1983 | Cooley et al. | 318/341 |
| 4,482,850 | 11/1984 | Sonoda et al. | 318/341 |

*Primary Examiner*—Stanley D. Miller
*Assistant Examiner*—K. Ohralik

*Attorney, Agent, or Firm*—Gerald E. Linden

[57] ABSTRACT

A driver circuit for an actuator senses the phase difference between a position request signal to the actuator and a feedback signal from the actuator. A first error signal is indicative of the phase difference when the feedback signal lags the position request signal, and a second error signal is indicative of the phase difference when the feedback signal leads the position request signal. The error signals are amplified in time to provide output drive signals that control four switches which are arranged so that when certain combinations of switches are closed, the actuator will increase or decrease its position, thereby driving the error signal to ZERO. The output drive signals are limited in time so that the loss of an input (position request signal or feedback signal) does not cause an output drive signal hardover and, consequently, does not cause an actuator hardover.

2 Claims, 3 Drawing Figures

FAIL-PASSIVE DRIVER CIRCUIT

TECHNICAL FIELD

The invention relates to fail-passive driver circuits and, more particularly, to those operating in association with pulse width modulation techniques.

BACKGROUND ART

Servo driver circuits control the positions of actuators. Pulse-width modulation techniques require the use of driver circuits capable of positioning an actuator as a function of the duration (or phase shift) of a pulse (position request) within a clocked cycle (modulation interval). In a closed-loop system, a feedback signal is provided in response to the actuator position and is compared to the position request to generate an error signal which is used to position the actuator. Consequently, failures, such as circuit failures or the loss of either the position request or feedback signal, can cause not only loss of control, but can cause a hardover as a result of full current to the actuator. In some applications, such as aerospace, it is preferable to lose control over an actuator rather than experience a hardover. Such loss of control in the event of a failure is referred to as fail-passiveness.

SUMMARY OF THE INVENTION

Therefore, it is an object of this invention to provide for fail-passiveness in a servo driver circuit, wherein a circuit failure or loss of either the position request or the feedback signal will not cause an actuator hardover.

According to the invention, an actuator is responsive to a command. The command is pulse-width modulated to provide a phase shifted position request signal that is applied to the clock input of a first flip-flop and to the reset input of a second flip-flop. A linear variable phase transformer is excited in sync with the position request signal. The LVPT output is phase shifted according to the position of the actuator and is applied to the clock input of the second flip-flop and to the reset input of the first flip-flop. Thus, the output of the first flip-flop is a first error signal that is indicative of the phase difference between the position request signal and the feedback signal when the feedback signal lags the position request signal, and the output of the second flip-flop is a second error signal that is indicative of the phase difference between the position request signal and the feedback signal when the feedback signal leads the position request signal. The error signals are amplified in time to provide a first output drive signal based on the first error signal and a second output drive signal based on the second error signal. The output drive signals control four switches that are arranged so that the closure of a certain combination of switches will cause the actuator to increase in position and the closure of another combination of switches will cause the actuator to decrease in position As the actuator position is brought into correspondence with the command, the error signals go toward ZERO. There is a limit on the duration of output drive signals to prevent hardovers.

Other objects, features and advantages of the invention will become apparent in light of the following detailed description of the invention.

BEST MODE FOR CARRYING OUT THE INVENTION

Figure 1:
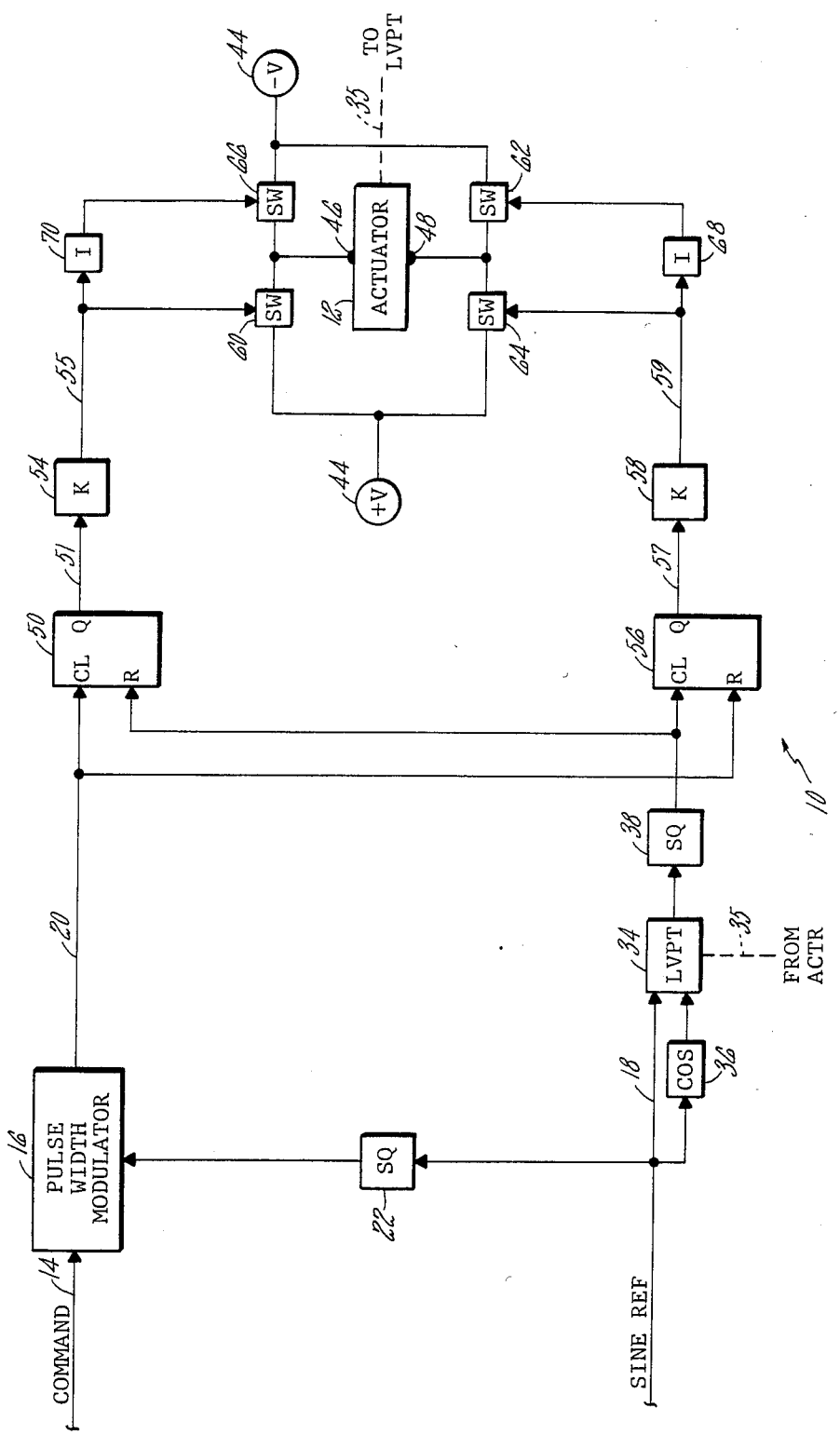
FIG. 1 is a schematic block-diagram of the driver circuit of this invention.

FIG. 1 shows a driver circuit 10 operable to position an actuator 12 in response to a command on a line 14. A pulse-width modulator circuit 16 is responsive to the command on the line 14 and also to a sync signal, such as a sine reference on a line 18, to provide pulses (position request signals) on a line 20, the phase of which are a function of the magnitude of the command. Each position request signal is within a modulation interval that is defined by successive negative zero crossings of the sine reference signal, or, as is preferable in the context of digital circuits, the successive low-high transitions of the sine reference signal after it is converted to a square wave by a squaring circuit 22. The position request signals end with a low to high transition.

The signals discussed above are shown in the chart of FIG. 2. The sine reference signal 26 has a negative zero crossing at time (t0) and the low to high transition of the square wave output 28 of the squaring circuit 22 is also at time (t0). The low to high transition of the position request signal 30 occurs at time (t1). Thus, the phase shift (t1−t0) of the position request signal is defined by the time at which its low to high transition occurs vis-a-vis the low to high transition of the signal 28 and is directly related to the magnitude of the command. The phase shift (t1−t0) of the position request signal is greater in response to a command for greater actuator position.

Referring again to FIG. 1, a linear variable phase transformer (LVPT) 34 is coupled via a suitable linkage 35 to the actuator 12 to provide a feedback signal indicative of the actuator position. The LVPT is excited by the sine reference signal in sync with the pulse-width modulation and is also excited by a cosine signal which is derived from the sine reference signal by a suitable phase circuit 36. The LVPT output (feedback signal) is a sine wave that is phase shifted from the sine reference signal by an amount proportional to the actuator position and is converted to a squarewave by a squaring circuit 38. As is graphically displayed in FIG. 2, the low to high transition of the square wave feedback signal 40 is in time coincidence (t2) with the negative zero crossing of the feedback signal 42. The phase shift (t2−t0) of the feedback signal 42 is proportional to the actuator position and is greater for an increased actuator position. When the actuator position corresponds to the command, the phase shift (t2−t0) of the feedback signal agrees with the phase shift (t1−t0) of the position request signal; in other words, (t2=t1). When the actuator position does not correspond to the command, the phase shift of the feedback signal does not agree with the phase shift of the position request signal and a phase difference (t2−t1) is proportional to the lack of agreement. The phase difference between the position request signal and the feedback signal is used to determine the direction and magnitude of an actuator position change that will result in correspondence between the actuator position and the command.

The actuator 12 of this example is a bidirectional DC force motor operable to increase or decrease its position in response to the direction which a voltage differential is applied across its winding. The voltage differential is provided by a source 44 having a first voltage (+V) and a second voltage (−V), one of which may be ground. The actuator winding terminates in a first input 46 and a second input 48. For this example, when the first voltage (+V) is applied to the first input 46 while the second voltage (−V) is applied to the second input 48, the actuator position decreases; and when the first voltage (+V) is applied to the second input 48 while the second voltage (−V) is applied to the first input 46, the actuator position increases.

Figure 2:
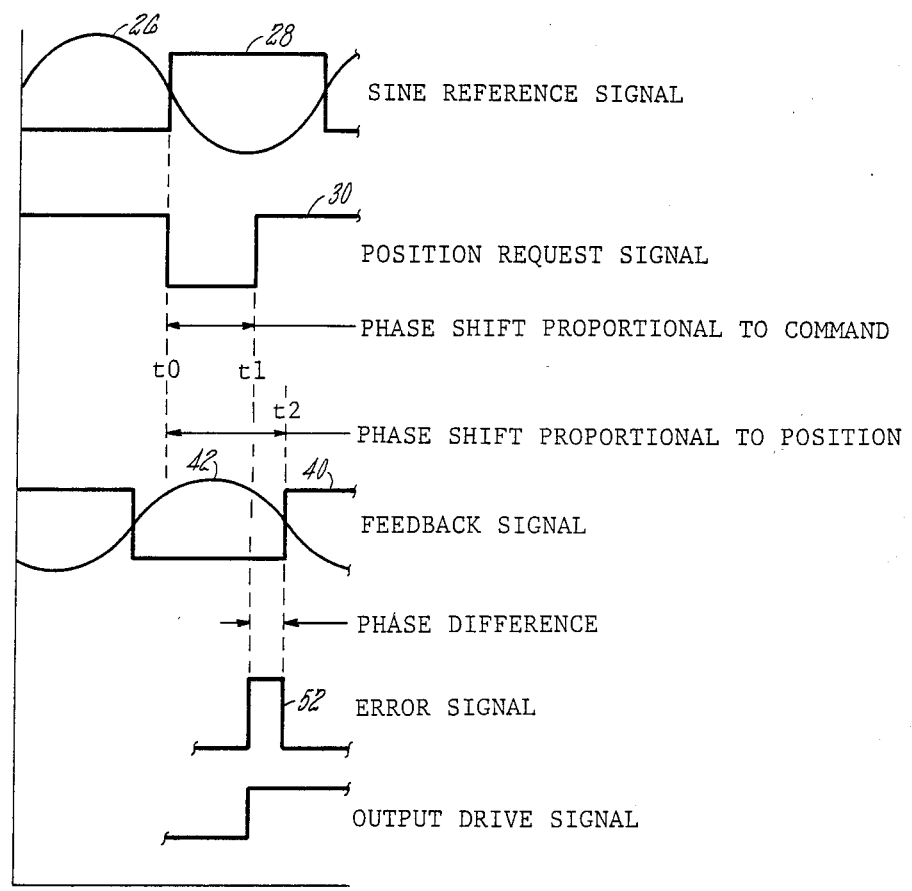
FIG. 2 is a chart showing representative waveforms at various points in the circuit of this invention.

A bistable device, such as a flip-flop 50, is connected in the circuit 10 so that it is clocked (CL) by the low to high transition of the position request signal and it is reset (R) by the low to high transition of the square wave feedback signal. When the actuator position is greater than the command, the feedback signal lags the position request signal. This causes an output (Q) on the line 51 which is a first error signal that initiates with the low to high transition of the position request signal and ends with the low to high transition of the feedback signal. In other words, the duration of the first error signal corresponds to the phase difference (t2−t1) between the position request signal and the feedback signal and is indicative of the amount by which the actuator position exceeds the command. Referring to FIG. 2, the error signal 52 is shown for this case. Returning to FIG. 1, since the first error signal is of short duration and at logic voltage levels, it is amplified in time by a pulse-width amplifier 54 having a time gain (K) to provide a first output drive signal on a line 55 which is used to decrease the actuator position in a manner described hereinafter. The pulse width amplifier 54 is essentially a one shot device, the period of which is variable depending upon the duration of the error signal. In other words, the duration of the output drive signal is (K) times the duration of the error signal. A limit is established so that there is a maximum one shot period which would occur in the event of a failure, as described hereinafter.

Similarly, a bistable device, such as a flip-flop 56 is clocked (CL) by the feedback signal and reset (R) by the position request signal so that its output (Q) on a line 57 is a second error signal (not shown in FIG. 2) having a duration corresponding to the time by which the feedback signal leads the position signal, indicative of an actuator position less than the command. The second error signal is similarly time expanded by an amplifier 58 having a gain (K), and a limit, to provide a second output drive signal on a line 59 which is used to increase the actuator position.

The actuator responds to the output drive signals in the following manner. Four switches 60, 62, 64 and 66 are provided, and the selective closure of one or another combination of switches will cause an increase or decrease in actuator position. Since the first output drive signal and the second output drive signal are dependent upon mutually exclusive events, (i.e., the feedback signal either leads or lags the position request signal, never both at once), their provision is also mutually exclusive. Therefore, when the first output drive signal is provided, the second output drive signal is not provided. In response to the provision of the first output drive signal, the switch 60 closes and connects the first voltage (+V) to the first input 46 of the actuator 12. In response to the nonprovision of the second output drive signal, an inverter 68 causes the closure of the switch 62 which connects the second voltage (−V) to the second input 48 of the actuator 12. This combination of switch closures causes the actuator position to decrease, thereby advancing the phase of the feedback signal to correspond more nearly to the position request signal and consequently driving the first error signal toward ZERO.

Similarly, when the second output drive signal is provided, the first output drive signal is not provided. In response to the provision of the second output drive signal, the switch 64 closes and connects the first voltage (+V) to the second input 48. In response to the nonprovision of the first output drive signal, an inverter 70 causes the closure of the switch 66 which connects the second voltage (−V) to the first input 46 of the actuator 12. This combination of switch closures causes the actuator position to increase, thereby retarding the phase of the feedback signal to correspond more nearly to the position request signal and consequently driving the second error signal toward ZERO. Between the end of one output drive signal and the onset of the next output drive signal, there is a quiescent state during which the switches 62 and 66 close, shorting out the winding of the actuator 12, so that the energy stored in the magnetic field of the actuator winding is utilized.

The maximum one shot period is provided so that an actuator hardover does not result from certain failure modes, such as an output drive signal hardover. Consider the case where the feedback signal is lost. The flip-flop 50 will clock (CL), providing an output (Q). Since the feedback signal is lost, the flip-flop 50 does not reset. Therefore, the error signal on the line 51 goes hardover. Consequently, the first output drive signal goes hardover, but only for the maximum one shot period. The subsequent provision of the position request signal in the next pulse interval does not retrigger the flip-flop 50; it simply remains clocked and another output drive signal is not provided. The case for the loss of the position request signal is analogous. It will result in the provision of a single limited second output drive signal. Therefore, an actuator hardover does not result from the loss of either input (position request signal or feedback signal).

Consider also the case of an output drive signal hardover which remains unchecked, such as from a failure of the pulse width amplifier to limit its output. For instance, a hardover of the first output drive signal on the line 55 will cause the sustained closure of the switch 60. If the actuator position is greater than commanded, the feedback signal lags the command so that the first error signal is provided and the second error signal is not provided. The provision of the first error signal is meaningless in the context of the first output drive signal hardover, but the nonprovision of the second error signal causes the closure of the switch 62 which completes the actuator circuit to cause the actuator position to decrease. Once the actuator position decreases a very small amount beyond the command, the second error signal and second output drive signal are provided which causes the closure of the switch 64 rather than the switch 62 so that the actuator is shorted (switches 60 and 64 closed) and no change in actuator position occurs. Thus, in the case of an output drive signal hardover, the actuator positions itself a small distance beyond the command, but will not go hardover. The only way for an actuator hardover to occur is for both output drive signals to go hardover simultaneously, and in the opposite sense; or for certain combinations of the switches 60, 62, 64 and 66 to fail.

Thus it may be seen that actuator motion is generally dependent upon the input (position request signal and feedback signal) low to high transitions and, even in the case of an output drive signal hardover, the actuator will not go hardover.

Figure 3:
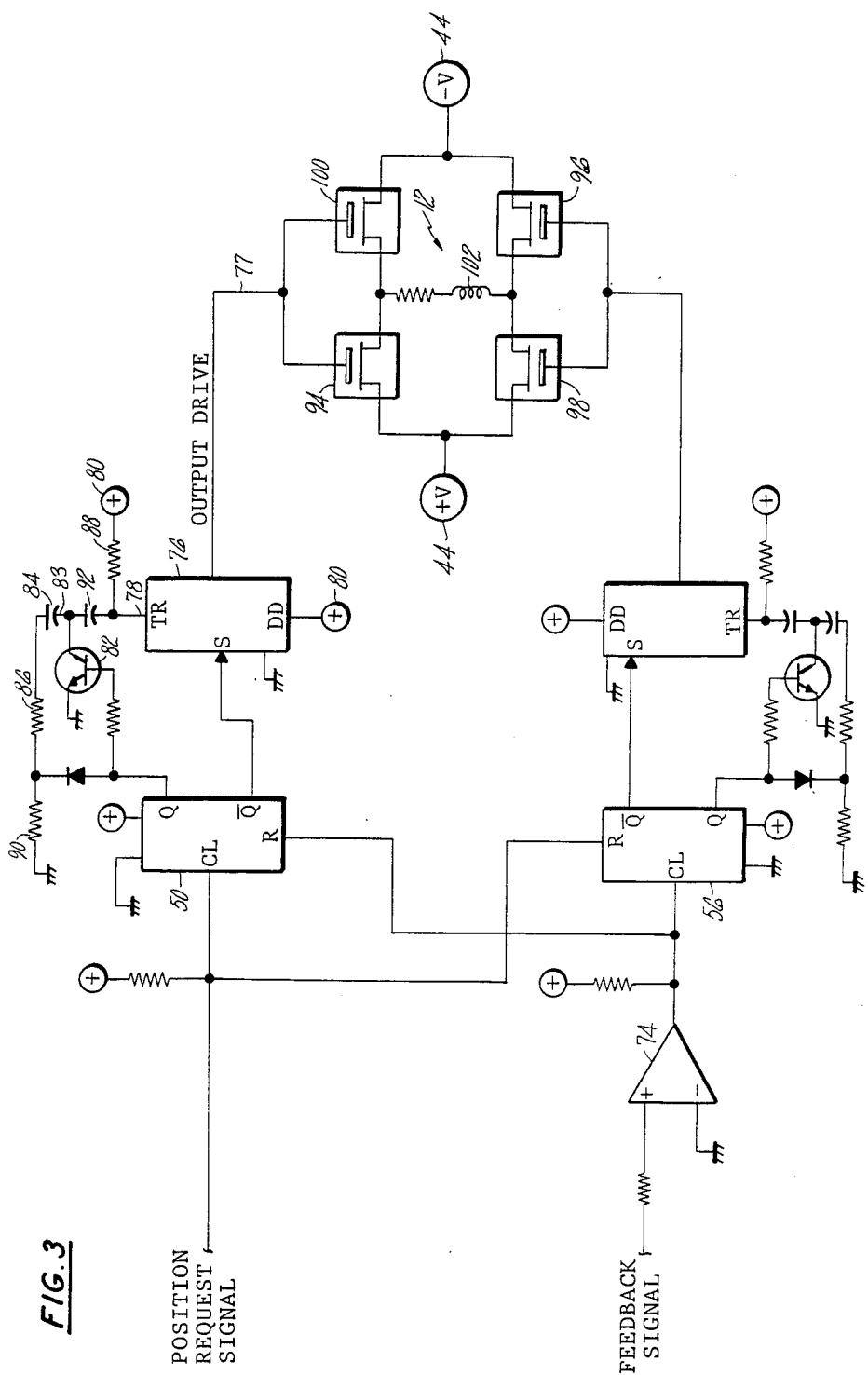
FIG. 3 is a more detailed schematic of the circuit of this invention.

A more detailed schematic of the driver circuit is shown in FIG. 3. Therein the flip-flop 50, such as a National Semiconductor CD4013B, is clocked (CL) by the position request signal and is reset (R) by the square wave feedback signal as provided by a comparator 74, such as a Precision Monolithic CMP04.

When the output (Q) of the flip-flop 50 goes high as a result of the feedback signal lagging the position request signal, the complementary output ($\overline{Q}$) transitions from high to low. This makes a single shot 76, such as a National Semiconductor 74C221, astable, causing the first output drive signal to be provided on a line 77. The first output drive signal persists until the single shot 76 is stable, which occurs when the voltage at its input 78 is at the transfer (TR) voltage, which is a certain percentage of the supply voltage (VDD) 80. The time that it takes for the voltage at the input 78 to reach the transfer voltage depends upon the duration of the first error signal; in other words, the duration of the (Q) output of the flip flop 50. This provides the time gain as discussed with respect to FIG. 1, and is implemented in the following manner.

A transistor 82 operates as a switch that is turned on, grounding a line 83, for the duration of the first error signal. During this time, a capacitor 84 charges through a resistor 86 to a value proportional to the voltage (logic level) and duration of the first error signal. When the transistor 82 turns off, at the end of the first error signal, the capacitor 84 is charged in the opposite direction by the supply voltage 80 through the sum of the resistor 86 and resistors 88 and 90. This charge buildup overcomes the opposite charge from the first error signal and continues to increase to the transfer voltage (TR) to make the single shot 76 stable. Although the charge curve is not a linear function, the time gain thus provided for small error signals is fairly linear. A second, larger capacitor 92 is provided which charges at a slower rate than the capacitor 84 and establishes the maximum one shot period. The maximum one shot period is chosen to be greater than the modulation interval for ease of analysis. The circuitry associated with the flip-flop 56 is essentially the same as that discussed with respect to the flip-flop 50, rendering further description thereof unnecessary.

Semiconductor switches 94, 96, 98 and 100 correspond to the switches 60, 62, 64 and 66 of FIG. 1, respectively, and selectively connect the winding 102 of the actuator 12 to the voltage source 44. The pair of switches 94 and 98 are the complement of the pair of switches 96 and 100; such as International Rectifier IRFF9130 for the former and International Rectifier IRFF130 for the latter, rendering the inclusion of the inverters (68 and 70 of FIG. 1) unnecessary. The circuit derives a further fail-passive characteristic from the failure mode of the electronic devices used. For instance, the failure mode of the semiconductor devices described with reference to FIG. 3 is to fail high or low, not to oscillate.

It should be understood that the invention has been described largely in terms of function achieving blocks and that the functions described herein could be achieved with a variety of devices, and that the sense of transitions and position increases and decreases are relative. The foregoing description of this invention is therefore intended to enable those skilled in the art to practice the invention. It should be understood that various other embodiments, modifications and substitutions as are suited to the particular use contemplated will become apparent upon examination and practice of the invention.

What is claimed is:

1. A fail-passive driver circuit for positioning an actuator in response to a command, wherein said actuator has a first input and a second input and is operable to decrease its position in response to a first voltage being applied to its first input while a second voltage is applied to its second input and is operable to increase its position in response to the first voltage being applied to its second input while the second voltage is applied to its first input, said circuit comprising:
    means for providing a pulse-width modulated position request signal in response to the command wherein the phase shift of the position request signal within the modulation interval is a function of the command;
    means for providing a phase shifted feedback signal in response to the position of the actuator;
    a first bistable device, having a clock input connected for response to the position request signal and having a reset input connected for response to the feedback signal, for providing a first error signal in response to the amount of time by which the feedback signal lags the position request signal;
    a second bistable device, having a clock input connected for response to the feedback signal and having a reset input connected for response to the position request signal, for providing a second error signal in response to the amount of time by which the feedback signal leads the position request signal;
    means for providing a first output drive signal in response to the first error signal;
    means for providing a second output drive signal in response to the second error signal;
    first switch means operable to provide the first voltage to the first input of the actuator in response to the provision of the first output drive signal;
    second switch means operable to provide the first voltage to the second input of the actuator in response to the provision of the second output drive signal;
    third switch means operable to provide the second voltage to the second input of the actuator in response to the nonprovision of the second output drive signal; and
    fourth switch means operable to provide the second voltage to the first input of the actuator in response to the nonprovision of the first output drive signal.

2. A circuit according to claim 1 wherein the first output drive signal is provided as a time expanded function of the first error signal and does not exceed a limit and the second output drive signal is provided as a time expanded function of the second error signal and does not exceed the limit.

* * * * *